INVENTOR.
RICHARD F. POST

United States Patent Office 3,093,569
Patented June 11, 1963

3,093,569
TRAVELING WAVE PYROTRON
Richard F. Post, Walnut Creek, Calif., assignor to the United States of America as represented by the United States Atomic Energy Commission
Filed July 31, 1961, Ser. No. 128,644
8 Claims. (Cl. 204—193.2)

The present invention relates to nuclear reactors in general, and more particularly to a traveling wave Pyrotron for continuous operation.

This application is a continuation-in-part of my copending application Serial No. 737,463 filed May 23, 1958, now abandoned.

Known devices for the raising of plasma to high kinetic temperatures and conducting nuclear reactions productive of neutrons therein have in general been cyclic in their operation. Conventional Pyrotrons as disclosed in my copending application, Serial No. 443,447, filed July 14, 1954, for example, have in general employed time rising magnetic containment fields to periodically trap and adiabatically compress gaseous plasma with an attendant increase in the density and energy of the plasma particles. Where plasmas of the nuclei of certain light element isotopes such as deuterium are involved and the plasma density and energy are increased, the cross section for binary reactions increases in a well known manner in accordance with widely published cross section tables. The frequency at which, for example, deuteron pair reactions occur in the plasma thus increases as the plasma is adiabatically compressed. A neutron and energetic charged reaction products are produced from each reaction. The containment field is then decreased resulting in expansion of the charged reaction products against the magnetic field and direct conversion of the charged reaction product energy to electrical energy in the containment field producing coil windings. Since the reactions are produced alternately with the production of electricity, the electrical energy so produced is necessarily intermittent or cyclic. Moreover, current flows from a source through the coil windings in one direction during the reaction production cycle. Current flows through the coil windings in the opposite direction during the electricity production cycle for delivery to utilizing equipment. Accordingly, in the cyclic mode of operation, complicated switching apparatus must be employed to cyclically decouple the source from the coils and at the same time couple the coils to the utilizing equipment and vice versa.

Advantages are therefore to be gained in the provision of plasma heating apparatus having a continuous operation. The difficulties encountered with cyclic reactors are overcome by such a continuous operating reactor since the electricity generated by direct conversion of the charged reaction products is unidirectional and accordingly does not necessitate the employment of complex switching apparatus.

The present invention provides a continuous operating reactor or device for increasing the energy and density of plasma and conducting nuclear reactions therein which hence possesses the above-noted advantages as well as other advantages. More particularly, the reactor of the present invention performs the normal operational functions of plasma injection, trapping, adiabatic compression, heating, expansion, electrical energy extraction, and the like, as are discussed in detail in the copending application referenced above, in an advantageously continuous manner by an appropriately biased traveling wave magnetic field. Such magnetic field includes an alternating component which exhibits unidirectional wave motion and a D.C. bias component upon which the alternating component is superimposed. The alternating component provides a continuous time separated series of magnetic containment fields (i.e., axially symmetric fields having minima regions terminally bounded by maxima regions of the traveling wave) each having a generally similar configuration to that disclosed in my copending application referenced hereinbefore and accordingly capable of containing charged particles (plasma) therein. The intensity of the bias component appropriately varies in the direction of wave motion such that the time separated series of containment field regions similarly vary in intensity during their motion. Moreover, the intensity variations are such as to continuously accomplish injection, trapping, compression, reaction, expansion, energy extraction, and other operations with charged particles in the containment field regions as the traveling wave containment fields continuously propagate through the reactor.

It is therefore an object of the present invention to provide a continuous operating nuclear reactor.

It is another object of the present invention to provide for the direct recovery of electrical energy from the energy of unburned or unreacted plasma ions as well as charged reaction products in a Pyrotron.

Yet another object of this invention is the provision of a Pyrotron having minimized losses of charged particles from the containment field.

Still another object of the invention is to provide a Pyrotron where traveling magnetic waves are employed to accomplish trapping, heating and energy recovery of charged particles within individual containment zones, each of which progresses along the machine with time.

A further object of the present invention is the provision of means for expending the energy of a stream of charged particles.

It is a still further object of the present invention to provide means for the continuous injection of plasma in a Pyrotron.

Other objects and advantages of the invention will become apparent by consideration of the following description taken in conjunction with the accompanying drawings, of which:

Figure 1:
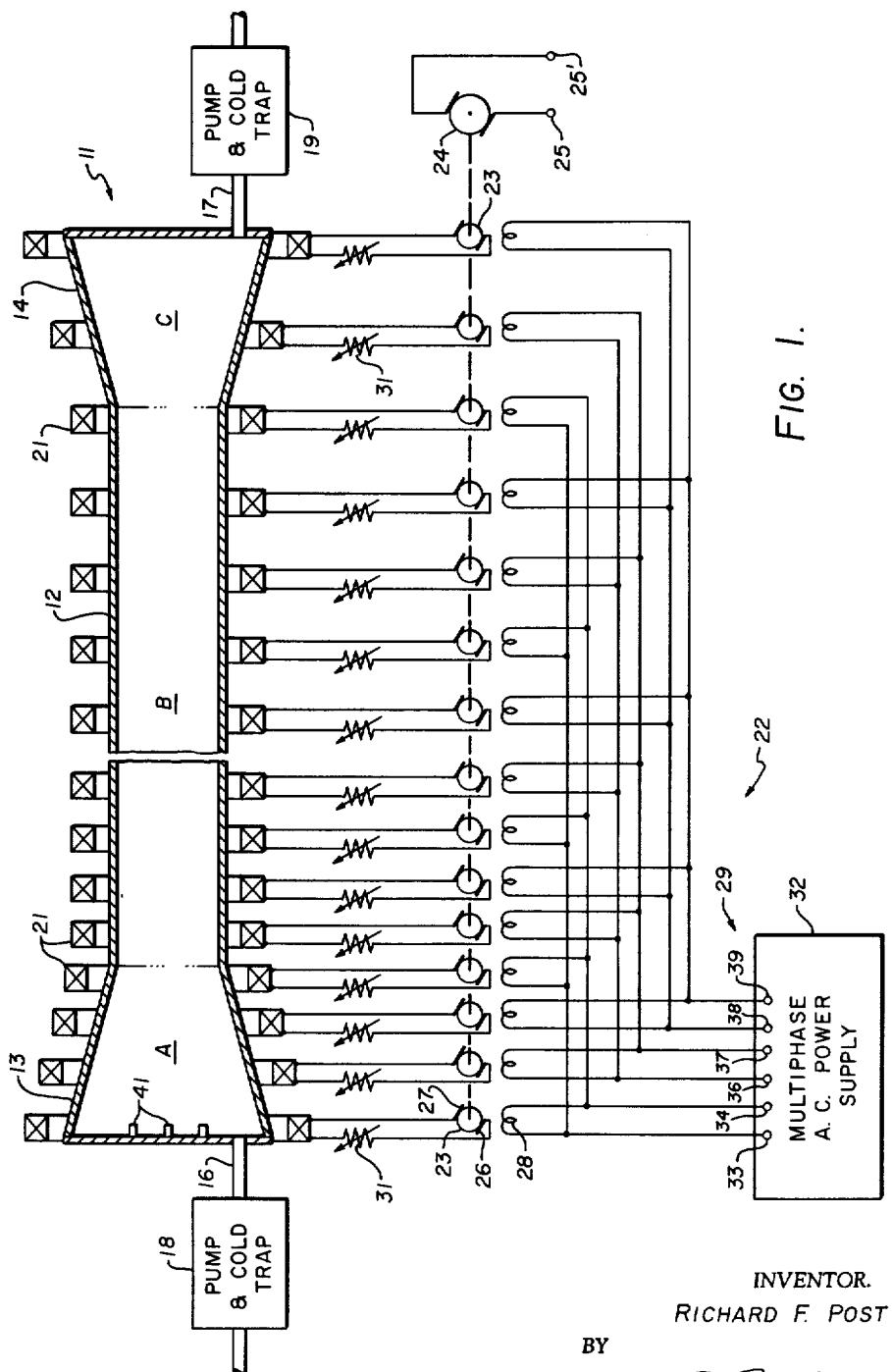
FIGURE 1 is a cross-sectional plan view, partially in schematic, of a preferred embodiment of the invention.

Considering now the invention in some detail and referring to the illustrated form thereof in the drawings, there is provided generally envelope means establishing a high vacuum region together with magnetic field generating means for generating within such region a traveling wave magnetic field in accordance with the salient aspects of the invention. More particularly, the traveling wave field includes alternate axially symmetric maxima and minima regions defining a continuous series of charged particle containment zones moving through the high vacuum region. As the containment zones move spatially through the vacuum region the intensity of the maxima and minima regions defining same preferably increase linearly in an injection and compression region, then increase linearly at a lesser gradual rate in a central reaction region, and finally decrease rapidly in an expansion and power extraction region. Charged particle source means are provided in the injection and compression region to introduce space charged neutralized plasma to the containment zones in transit therethrough and as the field intensity increases spatially, the plasma is adiabatically compressed and conditions requisite to the initiation of nuclear reactions are established. As the containment zones progress through the reaction region, the nuclear reactions are conducted at substantially constant temperature and density with an attendant production of energetic charged reaction products. As the containment zones decrease in magnetic intensity in transit through the expansion and power extraction region, the reaction products and unreacted plasma particles undergo an adiabatic decompression cycle resulting in a direct conversion of a portion of their energy to recoverable electrical energy in the field generating means.

As regards the envelope means of previous mention, and referring to FIGURE 1, such envelope means are preferably provided as a closed cylindrical vacuum tank 11 having an elongated central section 12 and enlarged end section 13, 14 outwardly flared therefrom. The material of construction of vacuum tank 11 may be any material suitable for high vacuum service and which is also pervious to time varying magnetic fields, e.g., thin stainless steel, boro-silicate glass, and the like. In order to evacuate the interior of tank 11 to suitable high vacuum dimensions of the order of $10^{-7}$ millimeters of mercury, vacuum conduits 16, 17, or equivalent means, are provided in communication with end sections 13, 14. Such conduits facilitate connection of suitable vacuum pump and cold trap means 18, 19 capable of producing the above-indicated vacuum dimensions within the envelope.

To generate the traveling wave magnetic field of the present invention, there is preferably provided a plurality of axially spaced solenoids 21 mounted concentrically about vacuum tank 11. The axial spacing between adjacent solenoids 21 encompassing end section 13 advantageously progressively decreases inwardly toward central section 12 for purposes which are subsequently described. Additionally, at the central section 12, the spacing between adjacent solenoids 21 progressively increases slowly in the direction of end section 14, and the solenoid spacing at end section 14 increases rapidly in the direction of the end of the vacuum tank.

Figure 2:
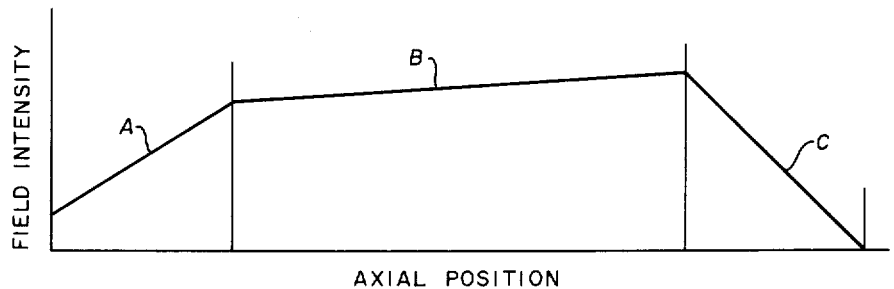
FIGURE 2 is an intensity profile of the D.C. bias component of magnetic field established along the axis of this embodiment.
Figure 3:
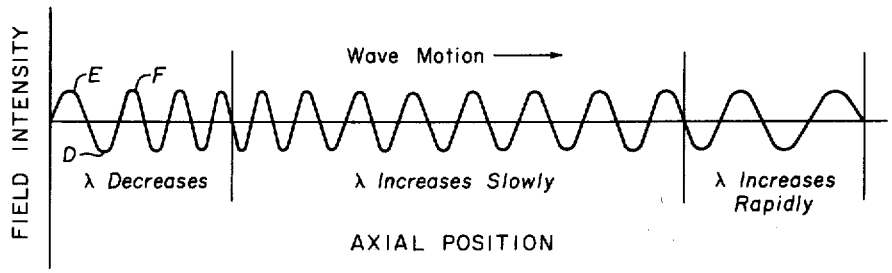
FIGURE 3 is an intensity profile of the A.C. traveling wave component of magnetic field established along the axis of this embodiment.
Figure 4:
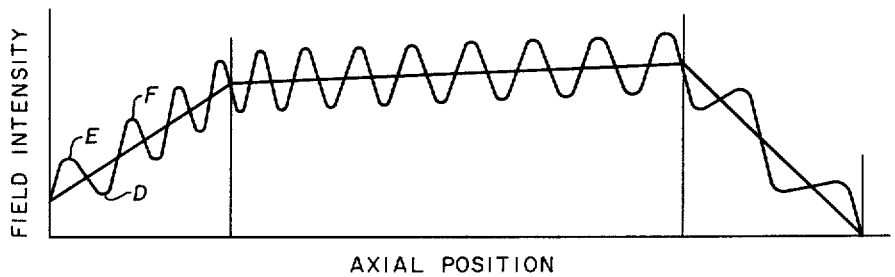
FIGURE 4 is an intensity profile of the resulting traveling wave magnetic containment field established along the axis of the embodiment of FIGURE 1 by a summation of the field components depicted by FIGURES 2 and 3.

Solenoids 21 are energized by appropriate D.C. biased multiphase A.C. source means 22 to establish a traveling wave axially symmetric magnetic field in accordance with the salient aspects of the present invention propagating through envelope 11 in the direction of end section 14. Multiphase source means 22 energizes the solenoids with currents of suitable relative amplitude and phase relations such that the D.C. component (average value) of the field with respect to axial position within envelope 11 is as depicted by FIGURE 2 of the drawings, whereas the A.C. component with respect to axial position is as depicted by FIGURE 3 of the drawings. It is to be noted (see FIGURE 2) that the D.C. field component increases uniformly with reference to axial position in an injection and compression region, A, enclosed by envelope section 13, increases very gradually in a reaction region, B, enclosed by central envelope section 12, and then decreases rapidly in an expansion and power extraction region, C, enclosed by envelope section 14. The A.C. field component generated (see FIGURE 3) has a wave length, $\lambda$, which by virtue of the spacing of solenoids 21 progressively decreases in region A, increases slowly in region B, and increases rapidly in region C. The resulting traveling wave field, established longitudinally of envelope 11 is consequently as illustrated in FIGURE 4 of the drawings. As shown therein, a continuous series of moving magnetic containment fields each comprising a field minima D terminally bounded by field maxima E, F are provided with the magnetic intensity of each containment field varying in accordance with the hereinbefore described D.C. component of FIGURE 2 as the containment field moves longitudinally through the high vacuum region within vacuum tank 11.

Considering now multiphase A.C. source means 22 in more detail and referring again to FIGURE 1, such source means may advantageously comprise a plurality of D.C. generators 23, shaft connected in tandem and driven by an electric motor 24. Motor 24 may be energized by applying voltage across terminals 25, 25'. The brushes 26, 27 of the plurality of generators 23 are respectively series connected to solenoids 21 and the field windings 28 of such generators are coupled to a suitable current source 29 the outputs of which slowly vary with respect to time. In order that the currents applied to solenoids 21 from generators 23 produce the spatially varying D.C. component of magnetic field illustrated in FIGURE 2, the magnitudes of such currents are appropriately varied relative to the axial position of the solenoids energized by same. To accomplish the foregoing, variable resistors 31 may be inserted in series with the outputs of generators 23. Resistors 31 are adjusted such that their resistance relative to the axial position along vacuum tank 11 of the corresponding solenoids 21 progressively decreases along section 13, decreases very gradually along central section 12, and increases rapidly along section 14. The corresponding average values of the current applied to successive solenoids 21 and therefore the D.C. component of magnetic field generated thereby thus increases along section 13, increases gradually along section 12, and decreases rapidly along section 14 in the manner depicted by FIGURE 2.

Alternatively, resistors 31 may be omitted and the turns-density of each solenoid 21 varied relative to its axial position along vacuum tank 11 in substantially direct proportion to the average intensity depicted by FIGURE 2. The current outputs from generators 23 in this case are substantially equal and the D.C. field component varies as the turns-densities of the solenoids 21.

Considering now current source 29 in detail, it is to be noted that same advantageously comprises a multiphase A.C. power supply 32 (e.g., a three-phase supply, six-phase supply, or the like) which generates alternating currents progressively displaced in phase at a plurality of pairs of output terminals 33, 34; 36, 37; 38, 39. Such pairs of output terminals are respectively connected in series with the field windings 28 of successive ones of generators 23. The frequency of the alternating current generated at terminals 33, 34; 36, 37; 38, 39 for the purposes of the present invention is extremely low, e.g., of the order of several cycles per second. Moreover, inasmuch as the alternating voltages generated at such terminals and applied to the field windings of generators 23 are progressively displaced in phase, the slow time varying fields thereby produced in successive ones of the generators are similarly respectively displaced in phase. The field variations in the generators 23 effect similar progressively phased cyclic variations in the output currents therefrom applied to successive solenoids 21. A slowly varying A.C. component is accordingly superimposed upon the D.C. component of energizing current applied to each solenoid 21 as hereinbefore described. Since the A.C. components generated from successive generators 23 are progressively separated in phase, the magnetic field generated by solenoids 21 includes time varying components which are progressively phased along the axis of vacuum tank 11. Such components, being separated in time and space, are effective in producing an A.C. traveling wave magnetic field component of the character illustrated in FIGURE 3 progressing slowly through vacuum tank 11. The resultant magnetic field including the D.C. and A.C. components established in vacuum tank 11 upon energization of solenoids 21 by generators 23 is accordingly as depicted by FIGURE 4 and hereinbefore described.

To introduce plasma (e.g., deuterium or tritium plasma or mixtures thereof) to vacuum tank 11, appropriate plasma injectors 41 are disposed within injection and compression region A enclosed by envelope section 13. Injectors 41 may comprise an array of ion sources and electron sources to introduce a space charge neutralized mixture of ions and electrons (i.e., plasma) to region A, or alternatively a plasma generator or plurality thereof. For a detailed description of a suitable plasma generator, reference may be had to a copending application for U.S. Letters Patent, Serial No. 589,831, filed June 6, 1956 by Winston H. Bostick et al., now Patent 2,900,548, dated August 18, 1959. The plasma ions may be injected in either the atomic or moleculer forms at low or high energies and in some instances as energetic neutrals. Injectors 41 are preferably mounted in region A such that the plasma particles enter the moving magnetic field established within such region A of vacuum tank 11 at a small pitch angle.

Considering now the operation of the traveling wave Pyrotron physically described above, a traveling wave magnetic field in accordance with the present invention as graphically illustrated in FIGURE 4 is established longitudinally of vacuum tank 11 progessing slowly in the direction of end section 14 upon energization of solenoids 21 by source 22. Plasma is injected at a small pitch angle from injectors 41 into the magnetic field in injection and compression region A. During times when a reflecting peak, E (maxima) of one of the continuous series of moving magnetic containment zones EDF (see FIGURE 4) is passing the plane where the injected plasma particles execute a small pitch angle, the particles are urged by the peak, E, toward the region of minimum intensity, D. The plasma particles are reflected from the leading reflecting peak, F, and returned to reflecting peak E in a manner which is described in detail in my copending application Serial No. 443,447 referenced hereinbefore. During the transit time of the plasma particles in returning to reflecting peak, E, the entire containment zone EDF moves in an axial direction away from injectors 41 with a simultaneous increase in the magnetic intensity thereof due to the increasing intensity of the D.C. field component within region A. The increase in intensity of peak, E, effectively raises the magnetic barrier over which the returning particles must pass to escape and thus prevents penetration of the peak, E, by the particles. The plasma is accordingly effectively trapped in the central region, D, of the containment zone.

Similarly at times the containment zone minima, D, passes plasma injectors 41, the injectors are instantaneously disposed relative to the traveling wave field, between the reflecting peaks E, F. The plasma particles are accordingly trapped within region, D, since the entire containment zone EDF moves a sufficient distance during the transit times of the plasma particles between the peaks E, F to prevent the particles from returning to the plane of the injectors 41.

The foregoing trapping processes result in the accumulation of a large charge of fuel plasma in containment zone E, D, F and each successively following containment zone of the traveling wave magnetic field. Moreover, since the intensity of each containment zone increases in transit through injection, compression region A enclosed by vacuum tank section 13, the plasma is adiabatically compressed resulting in densification and energization of the plasma particles. The particle densities and energies attained are commensurate with the initiation of nuclear reactions between the plasma particles contained in each magnetic containment zone.

The nuclear reactions initiated in the moving containment zones in injection and compression region A, are next conducted at substantially constant density and kinetic temperature (energy) in reaction region B enclosed by vacuum tank central section 12. In order for the reactions to occur at appreciable rates, it will be appreciated that the randomizing effect of collisions between the plasma ions must be minimized to the extent that the reaction rates offset end-diffusion losses from the collisions. This end is accomplished in the present invention by adiabatic radial compression and axial decompression effects introduced to the reacting plasma ions by the controlled variations in wave length of the A.C. component, indicated in FIGURE 3, in conjunction with the variations in D.C. component intensity, indicated in FIGURE 2. The controlled variations in wavelength and D.C. component intensity minimize the randomizing effects and inhibit end diffusion losses from the containment zones of the traveling wave magnetic field.

With ionized deuterium utilized as the plasma, the D—D reactions promoted by the very high kinetic temperatures and densities of the plasma deuterons during passage of the moving containment zones through reaction region B, in turn produce an appreciable subsidiary burning of D—D reaction products, T and $He_3$. The $He_3$—D reaction thus results with an attendant production of $He_4$ and a proton $+18.3$ mev. The reacting plasma within the containment zones moving through reaction region B thus includes large amounts of energy in the form of charged reaction products.

Upon entering expansion region C the charged reaction products, as well as unburned plasma ions and ambipolar electrons, contained within the moving magnetic containment zones expand (i.e., undergo an adiabatic decompression cycle) due to the progressive decrease in magnetic field intensity in said region. The expansion of the energetic charged reaction products, ions, and electrons against the expanding magnetic containment zones of the traveling wave magnetic field causes a substantial portion of the energy of such charged particles to be delivered to the field. The energy appears as induced voltage at the terminals of the solenoids 21 disposed about vacuum tank section 14 and such voltage is accordingly applied to the brushes 26, 27 of the corresponding generators 23 coupled to such solenoids. These generators are thus driven as motors subsequent to the initial establishment of nuclear reactions in region B and conversion of reaction energy to electrical energy in region C. The above generators 23 functioning as motors then drive the remainder of the generators to furnish at least a portion of the input energy for generating the traveling wave magnetic field. The input energy which must be supplied to terminals 25, 25' of drive motor 24 is thus reduced resulting in increased efficiency of operation of the plasma heating device.

Suggested design parameters for a practical embodiment of the apparatus described hereinbefore are as follows:

Vacuum envelope:
    Central section B—
        Length—150 feet
        Diameter—5 feet
    End section A—
        Length—40 feet
        Diameter—15 feet
    End section C—
        Length—40 feet
        Diameter—15 feet
Magnetic bias field:
    Section A—$1.5 \times 10^4$–$1.12 \times 10^5$ gauss (linear rise with respect to envelope length)
    Section B—$1.12 \times 10^5$–$1.37 \times 10^5$ gauss (linear rise with respect to envelope length)
    Section C—$1.25 \times 10^5$–0 gauss (linear fall with respect to envelope length)
Magnetic traveling wave field:
    Field strength—$\pm 0.25 \times 10^5$ gauss (alternation with respect to bias field strength)
Wave length:
    Section A—20 to 10 cm. (decreasing along length of section)
    Section B—10 to 12 cm. (increasing along length of section)
    Section C—12 to 20 cm. (increasing along length of section)

Plasma particle density:
  Section A (beginning of injection)—$5 \times 10^{12}$ per cc.
  Section B—$10^{14}$ per cc. (avg.)
  Section C—$5 \times 10^{12}$ per cc. (end of expansion)
Particle energy:
  D—D reaction
  Section A (injection)—25 kv.
  Section B (avg. energy of deuterons + reaction products)—250 kv.
  D+He$_3$ reaction (similar to D—D reaction but avg. energy of reaction products in section B somewhat higher).

While the invention has been disclosed with respect to a single preferred embodiment, it will be apparent to those skilled in the art that numerous variations and modifications may be made within the spirit and scope of the invention. For example the vacuum tank section 13 together with solenoids 21 disposed thereabout and associated energizing means 22 may be employed as a novel traveling wave plasma injector for continuously injecting energetic plasma into the magnetic containment zones of conventional Pyrotrons. The invention may also be advantageously utilized to expend the energy of any stream of energetic charged particles. Extremely energetic particles produced, for example, in a high energy particle accelerator and penetrating a nuclear target may be collected subsequent to passage therethrough by a device in accordance with the present invention communicably disposed proximate the target. The particles are accordingly trapped in the moving magnetic containment zones and upon conveyance through the expansion region deliver their unexpended energy to the magnetic field. Such unexpended particle energy is thus converted to usable electrical energy which may be utilized as an auxiliary source of accelerator driving power. Similarly, the device of the present invention may be effectively utilized to directly convert the energy of charged fission fragments, as produced in conventional nuclear fission reactors, to usable electrical energy. Thus it is not intended to limit the invention except as defined in the following claims.

What I claim is:

1. A traveling wave plasma heating device comprising an axially elongated vacuum tank establishing an evacuated space, magnetic field generating means carried by said vacuum tank to generate an axially symmetric traveling wave magnetic field progressing axially through said space with the alternate maxima and minima of the field defining a continuous series of moving axially symmetric magnetic containment zones for containing charged particles, said magnetic field progressively increasing in intensity along the axis of said space in the direction of wave motion within an injection region, said field gradually increasing in intensity in the direction of wave motion in a reaction region within said space axially adjoining said injection region, said field progressively decreasing in intensity in an expansion region axially adjoining said reaction region within said space in the direction of wave motion, and plasma generating means disposed within said injection region to inject plasma into said containment zones continuously moving therethrough whereby the plasma is trapped and compressed within each containment zone during passage through the injection region and then undergoes nuclear reactions with an attendant production of energetic reaction products during passage through the reaction region with the reaction products thereafter expanding against the field and delivering energy thereto during passage of the containment zones through the expansion region which energy is thenceforth transferred by said field to field generating components of said field generating means associated with said expansion region.

2. A traveling wave nuclear reactor comprising an axially elongated vacuum tank establishing an evacuated space, magnetic field generating means carried by said vacuum tank to generate a traveling wave magnetic field progressing axially through said space, said field having a D.C. component defined spatially with respect to the axis of said tank in the direction of wave motion by a region which increases progressively in magnetic intensity to terminate in a second region which increases gradually in intensity and extends into a third region which decreases progressively in intensity, said field having a traveling wave A.C. component superimposed upon said D.C. component with the alternate maxima and minima of the A.C. component defining a continuous series of moving containment zones for charged particles, said A.C. component having a wavelength which decreases in said first region to then increase slowly in said second region and increase rapidly in said third region, and charged particle source means communicating with said first region to inject nuclear fuel ions and space charge neutralizing electrons into said moving containment zones.

3. Apparatus for use with a system producing a stream of energetic charged particles for extracting energy therefrom comprising an axially elongated vacuum tank establishing an evacuated space in receiving relation to said stream of charged particles; solenoid means disposed coaxially of said vacuum tank; and direct current biased multiphase source means coupled in energizing relation to said solenoid means to generate an axially symmetric traveling wave magnetic field progressing axially through said space, said field having a D.C. component varying spatially in intensity with respect to the axis of said tank and a traveling wave A.C. component superimposed thereon with the alternate maxima and minima of the A.C. component defining a continuous series of moving containment zones for charged particles, said D.C. component defined in the direction of wave motion by a first region of progressively increasing intensity adjoining a second region of substantially constant intensity which terminates in a third region of progressively decreasing intensity, whereby said charged particles are trapped forming a plasma body in the containment zones of said first region and are progressively transported to said third region wherein said plasma expands against the decreasing intensity field to generate a current in the solenoid of said solenoid means disposed coaxially with respect thereto.

4. Means as defined by claim 3 further defined by the wavelength of said A.C. component in the direction of wave motion progressively decreasing in said first region, increasing slowly in said second region and increasing in said third region.

5. Means as defined by claim 3 wherein said direct current biased multiphase source means comprises a plurality of D.C. generators shaft connected in tandem and each including brushes and field windings, said brushes coupled in energizing relation to said solenoid means at positions spaced along the axis of said vacuum tank, a multiphase A.C. power supply generating a plurality of alternating currents respectively progressively displaced in phase at a plurality of output terminals, said output terminals connected in energizing relation to the field windings of said generators in respective axial succession, and an electric motor shaft connected to said generators.

6. A continuously operating nuclear reactor for producing nuclear reactions between plasma particles by increasing the energy and density of the plasma comprising an axially elongated vacuum tank; vacuum pump and cold trap means communicating with said tank to evacuate same to high vacuum dimensions; a plurality of axially spaced solenoids disposed concentrically about said tank; a plurality of D.C. generators shaft connected in tandem and each having brushes and field windings; current control means series connecting the brushes of said generators to said solenoids respectively; said current control means adjusted to produce currents of progressively increasing magnitudes in said solenoids spaced axially along a first section of said tank, gradually increasing magnitudes in solenoids spaced axially along a second section of said tank, progressively decreasing magnitudes in solenoids spaced axially along a third section of said tank; multiphase A.C. power supply means connected in energizing relation to the field windings of said generators to apply alternating currents progressively separated in phase to axially successive ones of said generators in the direction of said third vacuum tank section; an electric motor shaft connected in driving relation to said generators; and plasma generating means disposed at the end of said tank adjacent said first section to generate plasma particles at small pitch angles relative to the axis of said tank.

7. A continuously operating nuclear reactor as defined by claim 6 further defined by the axial spacing between said solenoids progressively decreasing along the first section of said vacuum tank, slowly increasing along the second section of said tank, and rapidly increasing along the third section of said tank.

8. A traveling wave reactor for producing deuteron pair reactions comprising a closed cylindrical vacuum tank having an elongated central section and enlarged end sections outwardly flared therefrom; vacuum pump and cold trap means communicably connected to the interior of said vacuum tank to establish high vacuum dimensions therein; a plurality of solenoids disposed concentrically about said vacuum tank in spaced relation along the axis thereof with the spacing between solenoids progressively decreasing along said first end section, increasing along said central section, and increasing at a greater rate along said second end section; successive ones of said solenoids having turns-densities progressively linearly increasing along said first end section, increasing gradually along the central section, and decreasing rapidly along the second end section; a plurality of D.C. generators shaft connected in tandem and each having brushes and a field winding; said generators respectively connected at their brushes to said solenoids; a multiphase A.C. power supply connected to the field windings of said generators to energize axially successive ones thereof with alternating voltages progressively displaced in phase; an electric motor shaft connected in driving relation to said generators; and plasma generating means disposed at the extremity of said vacuum tank adjacent said first end section to introduce deuterium plasma axially thereinto.

References Cited in the file of this patent

UNITED STATES PATENTS

| | | |
|---|---|---|
| 2,993,851 | Thomson et al. | July 25, 1961 |
| 3,015,748 | Hortwig et al. | Jan. 2, 1962 |
| 3,022,236 | Ulrich et al. | Feb. 20, 1962 |
| 3,029,361 | Hernqvist | Apr. 10, 1962 |

FOREIGN PATENTS

| | | |
|---|---|---|
| 1,219,357 | France | Dec. 28, 1959 |